United States Patent [19]
McVaugh

[11] Patent Number: 6,042,328
[45] Date of Patent: Mar. 28, 2000

[54] LIFTING DEVICE

[76] Inventor: Arthur K. McVaugh, Box 800, Green Lane, Pa. 18054

[21] Appl. No.: 09/085,358

[22] Filed: May 27, 1998

[51] Int. Cl.[7] ....................................................... B60P 1/54
[52] U.S. Cl. .......................... 414/546; 414/462; 212/180; 212/255; 212/261
[58] Field of Search .................................. 414/462, 471, 414/486, 487, 491, 543, 546, 547, 555, 812; 212/180, 255, 258, 261

[56] References Cited

U.S. PATENT DOCUMENTS

| | | |
|---|---|---|
| 2,949,198 | 8/1960 | Abbott ..................................... 414/546 |
| 2,982,431 | 5/1961 | Moody ................................. 414/546 X |
| 3,184,082 | 5/1965 | Hall . |
| 3,325,118 | 6/1967 | Hall . |
| 3,805,984 | 4/1974 | Schwarz et al. . |
| 3,820,673 | 6/1974 | McVaugh . |
| 3,946,887 | 3/1976 | Parker . |
| 4,044,963 | 8/1977 | Hostetler . |
| 4,084,708 | 4/1978 | Goodvin . |
| 4,090,624 | 5/1978 | Krein et al. . |
| 4,128,179 | 12/1978 | Gilbert . |
| 4,288,191 | 9/1981 | Lynch . |
| 4,591,309 | 5/1986 | Clapp, Jr. . |
| 4,594,041 | 6/1986 | Hostetler . |
| 4,971,509 | 11/1990 | Sechovec et al. . |
| 5,456,564 | 10/1995 | Bianchini ................................. 414/462 |
| 5,540,537 | 7/1996 | Welch .................................. 212/180 X |
| 5,649,732 | 7/1997 | Jordan et al. . |
| 5,662,449 | 9/1997 | Krinhop . |
| 5,752,799 | 5/1998 | Carey et al. ............................. 414/543 |
| 5,788,095 | 8/1998 | Watson ................................ 414/543 X |

OTHER PUBLICATIONS

Grablift Portable Truck Crane brochure.
Claje Dual Wave–Runner & Quad Rack brochure Claje Mfg., LLC.

Primary Examiner—James W. Keenan
Attorney, Agent, or Firm—John S Mundy

[57] ABSTRACT

A lifting device for attachment to a vehicle trailer hitch or the like. The device includes a hitch bar for attachment to the trailer hitch. A lateral extension arm is mounted on the hitch bar and a riser arm is rotatably mounted to the lateral extension arm. A boom arm is mounted on the riser arm, the boom arm having load attachment elements for attaching a load thereto. Also provided is a rotating element attached to the lateral extension arm and the boom arm for rotating the riser arm about the lateral extension arm to raise and lower the riser arm relative to the hitch bar. Raising and lowering of the riser arm moves the boom arm to transcribe a predetermined arc lying in a vertical plane. It is preferred to have the hitch bar centered on a platform centerline wherein the vertical plane intersects the centerline. The predetermined arc may be from about 130 degrees to about 150 degrees, and preferably 140 degrees, with respect to the bed of the vehicle. The device further includes a pair of opposed turret plates attached to one end of the lateral extension arm, wherein the riser arm and the rotating element are journaled within the turret plates.

10 Claims, 2 Drawing Sheets

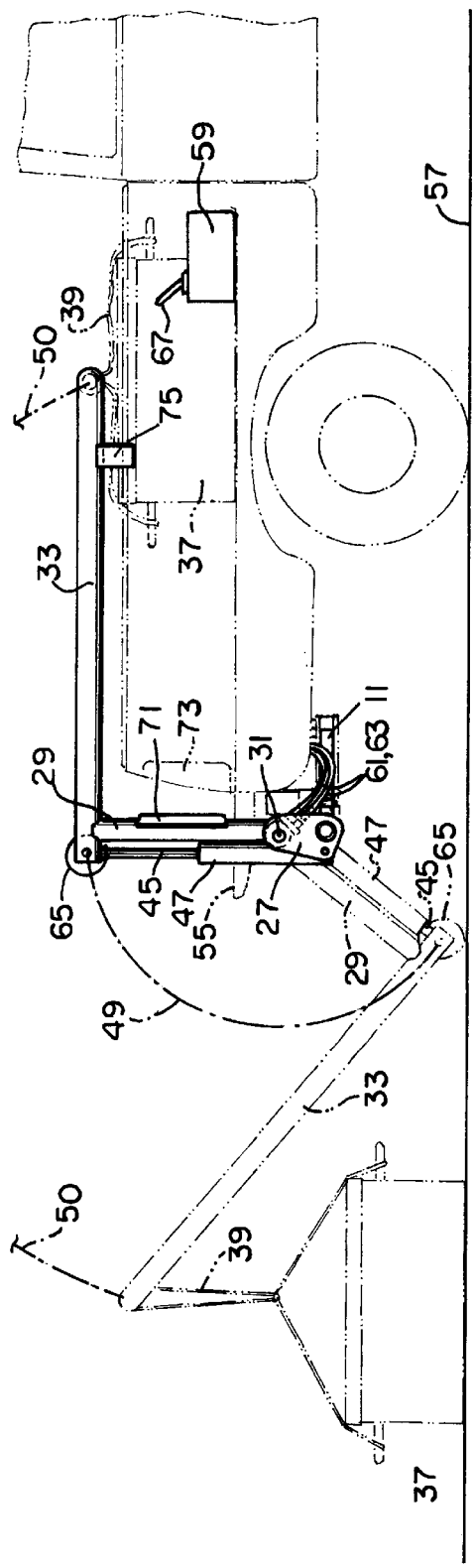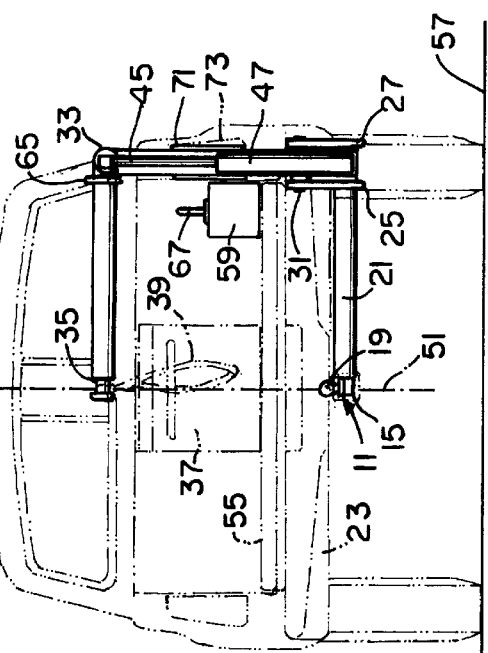

LIFTING DEVICE

FIELD OF THE INVENTION

The present invention relates to a lifting device for use with a truck or other vehicle having a platform or bed for carrying objects. More particularly, the invention relates to a lifting device that is adapted to be removably attached to a vehicle trailer hitch or the like and which is capable of lifting loads under hydraulic or other power.

BACKGROUND OF THE INVENTION

One of the most useful and popular vehicles today is the pickup truck, both for commercial and hobby activities. As part of the acceptance of pickups, not only for general transportation, hauling, top-cover carrying of tools and camping supplies, and pulling trailers and the like, is the desire for versatility. Of primary importance is the ability to use the bed of the pickup as a platform for hauling heavy objects.

Since pickup trucks have a load-rated hauling level much greater than one or two humans can quickly load into the bed, it has become desirable to be able to quickly and efficiently lift heavy objects into the pickup. Examples of loads are farm supplies such as animal feed, seeds and fertilizers, and the like. Hay bales are a common product carried by pickup trucks.

A number of the patents are to hay bale lifting devices. Goodvin U.S. Pat. No. 4,084,708 discloses a hay bale lifter that pivots about the hitch and lifts the unit using an electric winch. Krein et al U.S. Pat. No. 4,090,624 discloses a complicated hydraulic mechanism for lifting hay bales using a 'lost motion' means. Gilbert U.S. Pat. No. 4,128,179 is another bale loader using an electric winch. This patent also suggests that the device can be used as a crane for lifting other items.

Lynch U.S. Pat. No. 4,288,191 also uses an electric winch to life bales. Hostetler U.S. Pat. No. 4,594,041 lifts bales of hay onto a flat bed truck. Krinhop U.S. Pat. No. 5,662,449 is the most recent hay bale lifting device using a winch.

Several other patents disclose devices that do engage the trailer hitch, but not for lifting purposes. Schwarz et al U.S. Pat. No. 3,805,984 discloses a motorcycle carrier that is attached to a conventional trailer hitch. It does not disclose a hydraulic lifting system, nor is it inserted into the box portion of the hitch. Sechovec U.S. Pat. No. 4,971,509 describes a carrier for handicapped vehicles that utilizes the trailer hitch, tilting to provide access to the device. It does not actually lift the vehicle. Jordan et al U.S. Pat. No. 5,649,732 uses a ramp mounted in the trailer hitch, again without using a lifting capability.

Finally, Clapp U.S. Pat. No. 4,591,309, assigned to Champion Corporation, discloses a hydraulic real loader using two arms and refers back to my 1974 U.S. Pat. No. 3,820,673.

Clearly none of these patents disclose a simple device supported on the centerline hitch of a vehicle and using a hydraulic mechanism to lift loads without resort to complicated, expensive or elaborate mechanisms. None of the prior art provides a simple device for insertion into an existing trailer hitch by one person working alone, whereby the device is capable of easily lifting and loading up to at least 830 pounds or more without assistance. Particularly, no prior device exists for lifting large loads within a space not much larger than the area taken by the vehicle itself.

Accordingly, it is an object of the present invention to provide a lifting device for use with a pickup truck or other similar platform.

A further object of this invention is to provide a lifting device which does not unbalance the platform by placing weight or stress on one side over another side of the platform, thus requiring bracing and extra support when used with heavy loads.

Yet another object of this invention is to provide a lifting device that is easily attached to a vehicle, such as a pickup truck, by one individual of average strength, yet which device is capable of being stored on the vehicle or in a storage facility when not in use.

Other objects will appear hereinafter.

SUMMARY OF THE INVENTION

It has now been discovered that the above and other objects of the present invention may be accomplished in the following manner. Specifically, the present invention provides a lifting device for attachment to a trailer hitch or the like on a pickup truck or other vehicle. The device can also be mounted on stationary platforms, since the movement of the truck or other vehicle doesn't form part of the invention.

The device includes a hitch bar for attachment to the vehicle trailer hitch. Attached at one end to the hitch bar is a lateral extension arm. The other end of the lateral extension arm has attached thereto a pair of opposed turret plates. A riser arm is journaled within the turret plates such that the riser arm extends perpendicularly from the lateral extension arm.

A boom arm is attached to the riser arm, whereby the boom arm has load attachment means, such as a hook or the like, proximate its other end for attaching to a load. The riser arm is rotated about the lateral extension arm by a rotating means, such as an hydraulic cylinder and piston assembly, whereby the riser arm rotation transcribes said load attachment means through a predetermined arc lying in a vertical plane. Preferably, the hitch bar is centered on a platform centerline wherein this vertical plane intersects the centerline. The predetermined arc may be from about 130 degrees to about 150 degrees, and is preferably 140 degrees, with respect to the bed of the vehicle.

BRIEF DESCRIPTION OF THE DRAWINGS

For a more complete understanding of the invention, reference is hereby made to the drawings, in which:

FIG. 3 is a side elevational view of the device of this invention, showing the placement of a load on the vehicle in solid and dot/dash lines and the rotation of the lifting device to a load engaging position in dot/dash lines; and FIG. 4 is an end view of the device shown carrying a load on the platform of the vehicle.

DETAILED DESCRIPTION OF THE PREFERRED EMBODIMENT

Figure 1:
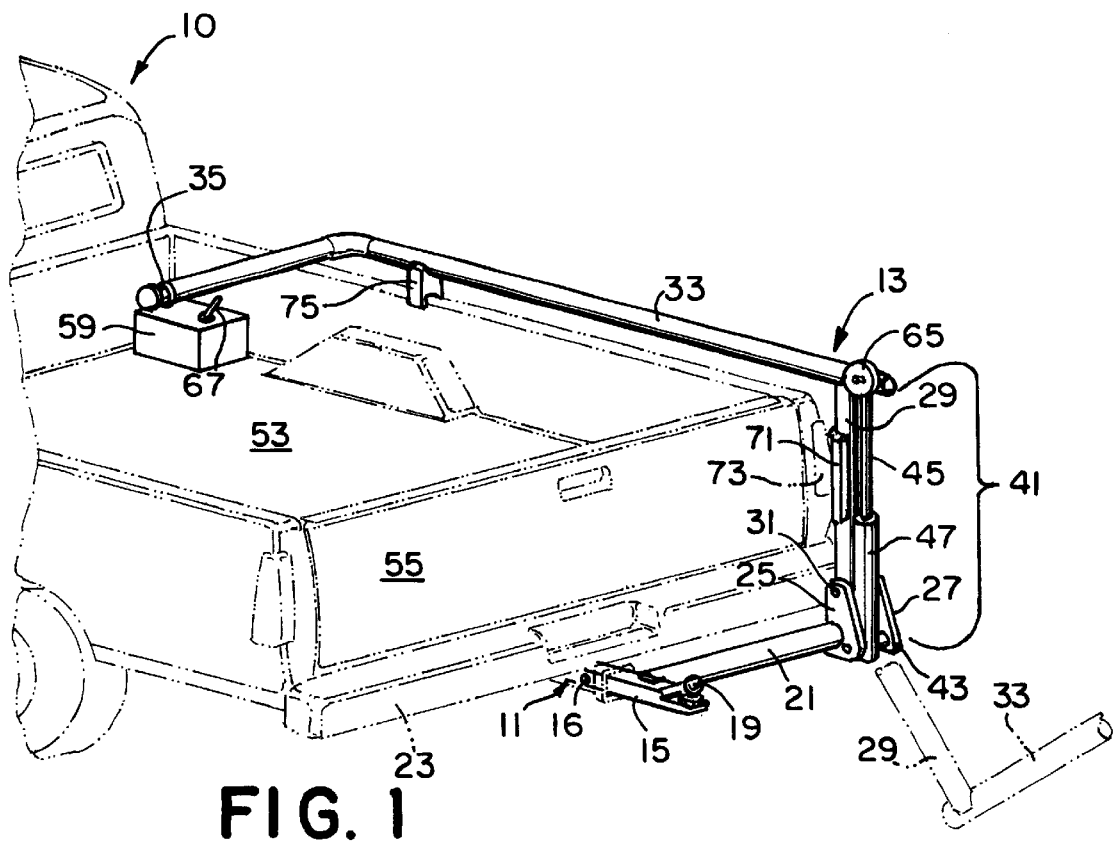
FIG. 1 is a perspective view illustrating the preferred embodiment of the present invention, in which the device is shown in solid lines positioned over the pickup truck bed and in dot/dash lines having rotated through the arc to engage or disengage an object on the ground.

As shown in the drawings, the present invention is used with a vehicle 10 having a trailer hitch 11 that is preferably bisected by vehicle centerline 17. The lifting device of the present invention is generally shown as 13 and includes hitch bar 15 that is inserted into trailer hitch 11. Hitch bar 15 extends outwardly from trailer hitch 11 along vehicle centerline 17. Centerline 17 lies within vertical plane 51 which also bisects vehicle 10. Hitch bar 15 is secured to trailer hitch 11 by, for example, pin 16 that is inserted into aligned holes piercing hitch bar 15 and trailer hitch 11. Pin 16 may be held in place by a cotter pin (not shown) or by other conventional means. Hitch bar 15 may include ball hitch 19 permitting towing of a trailer or other such device (not shown) when lifting device 13 is in its stowed position shown in the Figures in solid line. Trailer hitch 11 may also be reinforced in anticipation of prolonged or heavy use of lifting device 13.

Lateral extension arm 21 is perpendicularly attached to one end of hitch bar 15 and extends roughly parallel to rear bumper 23 of vehicle 10. A pair of opposed turret plates 25, 27 are attached to the outer end of extension arm 21 within which is rotatably journaled riser arm 29 by pin 31. Riser arm 29 extends perpendicularly from extension arm 21.

Figure 2:
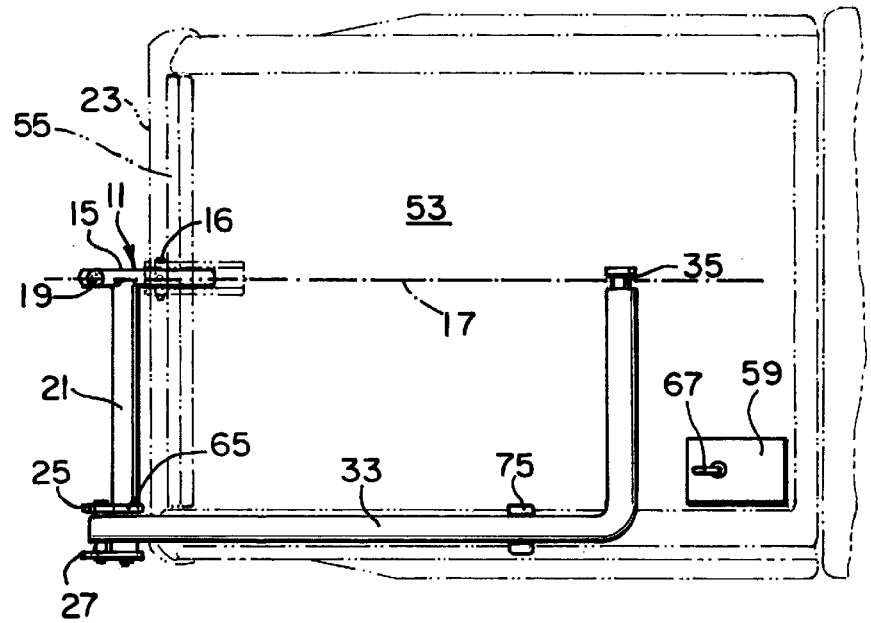
FIG. 2 is a top plan view of the device shown in FIG. 1.

L-shaped boom arm 33 is perpendicularly, fixedly attached to the distal end of riser arm 29 and preferably includes beveled portion 35 proximate its other end. While boom arm 33 need not necessarily be of a nearly ninety degree L-shape, this L-shape is preferable so as to minimize interference of boom arm 33 with load 37 during movement. As shown in FIG. 2, beveled portion 35 is centered over vehicle center line 17 and is adapted to facilitate attachment of load 37 via, for example, rope or wire 39 as shown in FIGS. 3 and 4. Other attachment devices may be used to secure load 37 to boom arm 33 such as, for example, hooks, pulley devices, or straps. Multiple boom arm 33 attachment points may be provided as long as load 37 is balanced over centerline 17.

It is noted that when in its stowed position, the various portions of lifting device 13 such as hitch bar 15, lateral extension arm 21, riser arm 29, and boom arm 33 are adapted to follow the contour lines of vehicle 10 to minimize projecting away from vehicle 10, thereby facilitating driving, maneuvering, parking and storage of vehicle 10.

Riser arm 29 is rotated about lateral extension arm 21 by a rotating device such as hydraulic cylinder and piston assembly 41 shown in FIGS. 1 and 3. One end of hydraulic cylinder and piston assembly 41 is journaled within turret plates 25, 27 by pin 43 and its other end is attached to boom arm 33. Lifting device 13 is in its stowage position as shown in solid lines in the Figures when piston 45 is fully extended from cylinder 47. Retraction of piston 45 within cylinder 47 of assembly 41 rotates riser arm 29 about extension arm 21, moving boom arm 33 such that beveled portion 35 transcribes through predetermined arc 49 as defined by the movement of riser arm 29 and arc 50 as defined by the movement of boom arm 33, as shown in FIG. 3. Arc 49 and arc 50 may be from about 130 to 150 degrees and is preferably 140 degrees with respect to bed 53 of vehicle 10.

It is possible to use a toggled hydraulic cylinder assembly, not shown, to increase arc 49 and arc 50 up to 180 degrees. This could be useful if, for example, load 37 is to be moved into or from a level lower than level 57 upon which the vehicle rests, such as transferring load 37 into a trench or pit. This would also be useful aboard ships to transfer load 37 into a ship's hold.

Hitch bar 15 is the only portion of lifting device 13 that is attached to vehicle 10 during use such that the entire weight of lifting device 13 and load 37 rests upon centerline vehicle hitch 11. Rotation of riser arm 29 from lifting device's stowed position lifts load 37 from vehicle bed or platform 53, over closed, or preferably open, vehicle tail gate 55 to ground level 57. Reversing the direction of rotation loads load 37 into bed 53. Since balanced load 37 is attached to boom arm 33 via beveled portion 35 which transcribes arc 49 lying in vertical plane 51 that bisects vehicle 10/bed 53, vehicle 10 remains balanced throughout translation of load 37. Thus vehicle outriggers or other stabilization devices are not necessary. Tests have demonstrated that with a single operator, lifting device 13 is capable of lifting and translating loads up to at least 830 pounds into and from vehicle bed 53. Although not shown, it is possible to adapt boom arm 33 to adjustably telescope its length relative to riser arm 29 to moderately shorten boom arm 33's length to increase the lifting power of lifting device 13 and allow lifting even heavier loads in certain circumstances.

Hydraulic hoses or lines 61, 63 are conventionally connected to hydraulic assembly 41 and run to control box 59 that is preferably located in the upper front corner of bed/platform 53 as shown in the Figures. Control box 59 may include lever 67, as shown in FIG. 4, or other appropriate controls to direct flow of hydraulic fluid to and from hydraulic assembly 41 to rotate riser arm 29 and thus control loading and unloading of load 37 about arc 49. Control box 59 may be placed in other locations, such as in the cab of vehicle 10, as long as the controls are easily accessible by the operator to permit safe and controlled use of lifting device 13. Control box may be powered by vehicle 10's electrical system or by a separate heavy duty battery (not shown). It is noted that rotation devices other than hydraulic assembly 41 may be used such as electric motors in which case, of course, hydraulic hoses 61, 63 are replaced by electrical wires, lines or the like to an appropriate control box.

It is possible to use a rod fit cylinder, not shown, instead of hydraulic assembly 41 as shown in the Figures to eliminate external fluid ports on the cylinder barrel. Although more expensive, this alternate design would minimize potentially environmentally harmful hydraulic fluid leaks.

As shown in dot and dash lines in FIGS. 1 and 3, wheel 65 may be rotatably mounted on the upper end of riser arm 29 so that at or near the maximum retraction of piston 45 within cylinder 47, wheel 65 engages ground level 57. Wheel 65 is provided to protect the end of riser arm 29 when lifting loads and so that lifting device 13 may be easily moved when it is disconnected from vehicle 10, allowing one person to mount and dismount lifting device to and from vehicle 10. To dismount lifting device 13, load 37 is disconnected from boom arm 33 and riser arm 29 is rotated so that wheel 65 contacts ground level 57 to release the pressure of hitch bar 15 against trailer hitch 11. Hydraulic hoses 61, 63 are detached from hydraulic assembly 41 and appropriately stored. Pin 16 is removed from hitch bar 15 and trailer hitch 11, disconnecting them. Lifting device 13 is grasped by boom arm 33 and is pulled away from vehicle 10 sliding hitch bar 15 from within trailer hitch 11 while balancing lifting device 13 on wheel 65. Lifting device 13 is then moved on wheel 65 to an appropriate storage location and pin 16 may be inserted within hitch bar 15 so it is not misplaced.

To mount lifting device 13 to vehicle 10, the process is essentially reversed. Pin 16 is removed from hitch bar 15 as necessary, lifting device 13 is balanced upon wheel 65 and moved towards vehicle 10. Hitch bar 15 is aligned with trailer hitch 11 and lifting device 13 is pushed towards vehicle 10 so that hitch bar 15 engages and slides within trailer hitch 11. The holes in hitch bar 15 and trailer hitch 11 are aligned and pin 16 is inserted therein and secured as appropriate.

Hydraulic hoses 61, 63 are connected to hydraulic assembly 41 and tested before use of lifting device 13.

For safety during transportation, lifting device 13 is placed in its stowed position shown in the Figures in solid line. As is shown in FIGS. 1 and 3, rest support 75 may be placed along the upper railing of vehicle 10 to receive and support boom arm 33 while lifting device 13 is in the stowed position. Rest support 75 stabilizes boom arm 33 and lifting device 13 when stowed and prevents boom arm 33 from impacting and damaging itself and vehicle 10 during movement of vehicle 10.

Additionally, during transportation of lifting device 13 tail light enhancer 71 may be removably mounted to riser arm 29 by VELCRO® strips or by other appropriate means, so that tail light enhancer 71 faces vehicle tail light 73. Tail light enhancer 71 is made of a tinted plastic material and sized to radiate braking and turn signal illumination of otherwise obscured tail light 73 towards the rear of vehicle 10 to advise following motorists of the actions and intentions of the driver of vehicle 10.

Lifting device 13 is admirably suited for use with a pickup truck and has shown great versatility in, for example, various construction and farming applications as well as with hobbies and general hauling tasks. Lifting device 13 may also be mounted on a fixed platform, such as a loading dock and can be used for maritime loading and unloading of boats and ships such as fishing boats or pleasure craft. Although shown mounted on the right side of vehicle 10 when viewed from the rear, lifting device 13 may be modified to allow mounting on the opposite side of vehicle 10 (along with control box 59 as necessary) when, for example, vehicle 10 is driven in countries that require vehicles to drive to the left side of roads. By mounting lifting device 13 on the outward side of vehicle 10, loading and unloading of loads 37 next to roads may be accomplished while avoiding any traffic in adjacent lanes of travel.

While particular embodiments of the present invention have been illustrated and described, it is not intended to limit the invention, except as defined by the following claims.

I claim:

1. A lifting device for attachment to a trailer hitch on a platform for carrying cargo and having a longitudinal axis, comprising:

a hitch bar including means for detachable attachment to a trailer hitch disposed on the longitudinal axis;

a lateral extension arm mounted on said hitch bar;

a riser arm rotatably mounted to said lateral extension arm;

a boom arm mounted on said riser arm, said boom arm having load attachment means for attaching to a load, said boom arm being positioned to place said load vertically above the longitudinal axis of said platform, rotating means comprising an hydraulic cylinder and piston assembly attached to one end of said lateral extension arm and said boom arm for rotating said riser arm about said lateral extension arm and above the longitudinal axis of said platform to raise and lower said riser arm relative to said hitch bar without said lateral extension arm or said boom arm extending beyond the width of said platform; wherein said raising and lowering of said riser arm moves said boom arm whereby said load attachment means transcribes an arc above the longitudinal axis of said platform and lying in a vertical plane such that the load and the force on the vehicle are centered on the longitudinal axis.

2. The device of claim 1, wherein said hitch bar is centered on a platform centerline and wherein said vertical plane intersects said centerline.

3. The device of claim 2, wherein said predetermined arc is from about 130 degrees to about 150 degrees with respect to the platform.

4. The device of claim 3, wherein said predetermined arc is about 140 degrees with respect to the platform.

5. The device of claim 2, further comprising a pair of opposed turret plates attached to said one end of said lateral extension arm, wherein said riser arm and said rotating means are journaled within said turret plates.

6. The device of claim 2, wherein translation of the load about said arc maintains said load over said centerline.

7. A lifting device for attachment to a trailer hitch on a vehicle having a bed for carrying cargo and having a longitudinal axis, comprising:

a hitch bar including means for detachable attachment to the trailer hitch disposed on the longitudinal axis;

a lateral extension arm attached at one end to said hitch bar and having a pair of opposed turret plates mounted at its other end;

a riser arm journaled within said turret plates, said riser arm extending perpendicularly from said lateral extension arm;

a boom arm attached proximate one end thereof to said riser arm, said boom arm having load attachment means proximate the other end thereof for attaching to a load, said boom arm being positioned to place said load vertically above the longitudinal axis of said bed; and rotating means comprising an hydraulic cylinder and piston assembly and attached to said one end for rotating said riser arm about said lateral extension arm without said lateral extension arm or said boom arm extending beyond the width of said bed, and above the longitudinal axis of said bed, whereby said riser arm rotation transcribes said load attachment means through a predetermined arc lying in a vertical plane, such that the load and the force on the vehicle are centered on the longitudinal axis.

8. The device of claim 7, wherein said hitch bar is centered on a platform centerline and wherein said vertical plane intersects said centerline.

9. The device of claim 8, wherein said predetermined arc is from about 130 degrees to about 150 degrees with respect to the bed of the vehicle.

10. The device of claim 9, wherein said predetermined arc is about 140 degrees with respect to the bed of the vehicle.

* * * * *